United States Patent
Kim et al.

(10) Patent No.: US 9,867,128 B2
(45) Date of Patent: Jan. 9, 2018

(54) POWER REDUCTION MODE OPERATION METHOD IN WIRELESS LAN SYSTEM SUPPORTING CHANNEL FOR DOWNLINK, AND APPARATUS THEREFOR

(71) Applicant: LG ELECTRONICS INC., Seoul (KR)

(72) Inventors: Jeongki Kim, Seoul (KR); Kiseon Ryu, Seoul (KR); Giwon Park, Seoul (KR); Hangyu Cho, Seoul (KR); Suhwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/101,608

(22) PCT Filed: Dec. 12, 2014

(86) PCT No.: PCT/KR2014/012269
§ 371 (c)(1),
(2) Date: Jun. 3, 2016

(87) PCT Pub. No.: WO2015/093792
PCT Pub. Date: Jun. 25, 2015

(65) Prior Publication Data
US 2017/0295541 A1    Oct. 12, 2017

Related U.S. Application Data

(60) Provisional application No. 61/917,351, filed on Dec. 18, 2013, provisional application No. 61/927,485, filed on Jan. 15, 2014.

(51) Int. Cl.
*H04W 52/02* (2009.01)
*H04W 72/12* (2009.01)
(Continued)

(52) U.S. Cl.
CPC ....... *H04W 52/0216* (2013.01); *H04W 52/44* (2013.01); *H04W 72/12* (2013.01); *H04W 52/0206* (2013.01); *H04W 84/12* (2013.01)

(58) Field of Classification Search
CPC ............. H04W 84/12; H04W 52/0216; H04W 74/006; H04W 88/08; H04W 74/06;
(Continued)

(56) References Cited

U.S. PATENT DOCUMENTS

2015/0131508 A1*  5/2015  Merlin ............. H04W 52/0216
                                                  370/311

FOREIGN PATENT DOCUMENTS

WO    2013162339    10/2013

OTHER PUBLICATIONS

PCT International Application No. PCT/KR2014/012269, Written Opinion of the International Searching Authority dated Feb. 16, 2015, 18 pages.
(Continued)

*Primary Examiner* — Keith Ferguson
(74) *Attorney, Agent, or Firm* — Lee, Hong, Degerman, Kang & Waimey PC

(57) ABSTRACT

The present document relates to a power reduction mode operation of a STA in a wireless communication system. To this end, during the STA's power saving mode operation, the TIM (traffic indication map) reception, the PS poll signal transmission, and the data reception are performed through one of a downlink oriented channel and a general channel distinguished from the downlink oriented channel, and the STA may previously acquire information on whether the TIM reception, the PS poll signal transmission, and the data reception are performed through one channel of the downlink oriented channel and the general channel.

14 Claims, 15 Drawing Sheets

(51) Int. Cl.
*H04W 52/44* (2009.01)
*H04W 84/12* (2009.01)

(58) Field of Classification Search
CPC ............ H04W 88/02; H04W 52/0206; H04W 52/0235; H04W 74/002; H04W 72/042; H04W 48/12; H04W 52/0209; H04W 72/12; H04W 52/02; H04W 72/0413; H04W 72/04
USPC .............. 455/343.3, 343.1, 343.2, 343.4, 455/343.5–343.6, 574, 572, 550.1, 445, 455/507, 508, 514, 515, 500, 517, 450, 455/426.1, 426.2, 412.1, 412.2; 370/310, 370/311, 328, 329, 338
See application file for complete search history.

(56) References Cited

OTHER PUBLICATIONS

Shiao-Li Tsao, et al., "A Survey of Energy Efficient Mac Protocols For IEEE 802.11 WLAN", Computer Communications 34, 2011, 14 pages.
Dezhi Zhang, et al., "Power Saving Mechanism Consideration for 802.11ah Framework", IEEE 11-11/1204r1, Sep. 18, 2011, 9 pages.

\* cited by examiner

POWER REDUCTION MODE OPERATION METHOD IN WIRELESS LAN SYSTEM SUPPORTING CHANNEL FOR DOWNLINK, AND APPARATUS THEREFOR

CROSS-REFERENCE TO RELATED APPLICATIONS

This application is the National Stage filing under 35 U.S.C. 371 of International Application No. PCT/KR2014/012269, filed on Dec. 12, 2014, which claims the benefit of U.S. Provisional Application Nos. 61/917,351, filed on Dec. 18, 2013 and 61/927,485, filed on Jan. 15, 2014, the contents of which are all hereby incorporated by reference herein in their entirety.

TECHNICAL FIELD

The present invention relates to a wireless communication system, and more particularly, to a method and apparatus for performing a Power Save (PS) mode operation by a Station (STA) in a high-density Wireless Local Area Network (WLAN) system supporting a downlink oriented channel.

BACKGROUND ART

While downlink channels as proposed hereinbelow may be used in various kinds of wireless communications, a WLAN system will be taken as an exemplary system to which the present invention is applicable.

Standards for the WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

In IEEE 802.11, communication is conducted on a shared wireless medium. Therefore, the communication environment of IEEE 802.11 is fundamentally different from a wired channel environment. For example, communication can be conducted based on Carrier Sense Multiple Access/Collision Detection (CSMA/CD) in the wired channel environment. In other words, once a transmitter transmits a signal, the signal arrives at a receiver without much signal attenuation because there is no great change in the channel environment. If two or more signals collide with each other, they can be detected because power sensed at the receiver instantaneously gets larger than power transmitted by the transmitter.

However, since a channel is affected by various factors (e.g., signal attenuation may increase with a distance or the signal may suffer from instantaneous deep fading) in the wireless channel environment, the transmitter cannot determine by carrier sensing whether the receiver has received a signal successfully or signal collision has occurred.

DISCLOSURE

Technical Problem

In the above-described wireless communication system, there is a need for transmitting and receiving a signal by efficiently controlling interference between Stations (STAs). However, since data transmission from an Access Point (AP) may be delayed due to indirect control between STAs in a high density Wireless Local Area Network (WLAN) system, a technique for efficiently performing data transmission from an AP to a STA is required.

Technical Solution

In an aspect of the present invention, a method of operating in a power save mode by a Station (STA) in a Wireless Local Area Network (WLAN) system includes entering the power save mode after performing an association procedure with an Access Point (AP), receiving a Traffic Indication Map (TIM) from the AP in a listening interval configured for the power save mode, if the TIM indicates the presence of data to be received from the AP, transmitting a Power Save Poll (PS-Poll) signal to the AP, receiving a response signal to the PS-Poll signal from the AP, and receiving data from the AP. The TIM reception, the transmission of the PS-Poll signal, and the data reception are performed on a downlink oriented channel or a normal channel distinguished from the downlink oriented channel, and the STA preliminarily acquires information indicating on which channel between the downlink oriented channel and the normal channel the TIM reception, the transmission of the PS-Poll signal, and the data reception are performed.

In another aspect of the present invention, a method of supporting a power save mode of an STA by an AP in a WLAN system includes performing an association procedure with one or more STAs, receiving a signal indicating entrance into the power save mode from a first STA among the one or more STAs, if there is data to be transmitted to the first STA, transmitting a TIM to the first STA in a listening interval configured for the power save mode, receiving a PS-Poll signal from the first STA, transmitting a response signal to the PS-Poll signal to the first STA, and transmitting data to the first STA. The TIM transmission, the reception of the PS-Poll signal, and the data transmission are performed on a downlink oriented channel or a normal channel distinguished from the downlink oriented channel, and the AP preliminarily acquires information indicating on which channel between the downlink oriented channel and the normal channel the TIM transmission, the reception of the PS-Poll signal, and the data transmission are performed.

In another aspect of the present invention, an STA supporting a power save mode in a WLAN system includes a transceiver configured to transmit and receive a signal to and from an AP on a downlink oriented channel or a normal channel distinguished from the downlink oriented channel, and a processor connected to the transceiver and configured to control operation of the transceiver. The processor is configured to enter the power save mode after performing an association procedure, and if the transceiver receives a TIM from the AP in a listening interval configured for the power save mode and the TIM indicates the presence of data to be received from the AP, to transmit a PS-Poll signal to the AP, receive a response signal to the PS-Poll signal from the AP, and receive data from the AP, through the transceiver. The TIM reception, the transmission of the PS-Poll signal, and the data reception are performed on a downlink oriented channel or a normal channel distinguished from the downlink oriented channel. The processor preliminarily acquires information indicating on which channel between the downlink oriented channel and the normal channel the TIM reception, the transmission of the PS-Poll signal, and the data reception are performed.

In another aspect of the present invention, an AP for supporting a power save mode of an STA in a WLAN system includes a transceiver configured to transmit and receive a signal to and from one or more STAs on a downlink oriented channel or a normal channel distinguished from the downlink oriented channel, and a processor connected to the transceiver and configured to control operation of the transceiver. The processor is configured to perform an association procedure with the one or more STAs, to receive a signal indicating entrance into the power save mode from a first STA among the one or more STAs through the transceiver and, if there is data to be transmitted to the first STA, to transmit a TIM to the first STA in a listening interval configured for the power save mode, receive a PS-Poll signal from the first STA, transmit a response signal to the PS-Poll signal to the first STA, and transmit data to the first STA, through the transceiver. The TIM transmission, the reception of the PS-Poll signal, and the data transmission are performed on a downlink oriented channel or a normal channel distinguished from the downlink oriented channel, and the processor preliminarily acquires information indicating on which channel between the downlink oriented channel and the normal channel the TIM transmission, the reception of the PS-Poll signal, and the data transmission are performed.

Advantageous Effects

According to the present invention as described above, system performance can be increased and the data transmission delay of an STA can be minimized, by reducing the data transmission delay of an AP in a high-density WLAN situation in which a plurality of STAs are associated with a single AP.

BEST MODE

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, a detailed description will be given of the introduction of the concept of a downlink oriented channel, and a method and apparatus for conducting communication using a downlink oriented channel in a high-density Wireless Local Area Network (WLAN) system.

Figure 1:
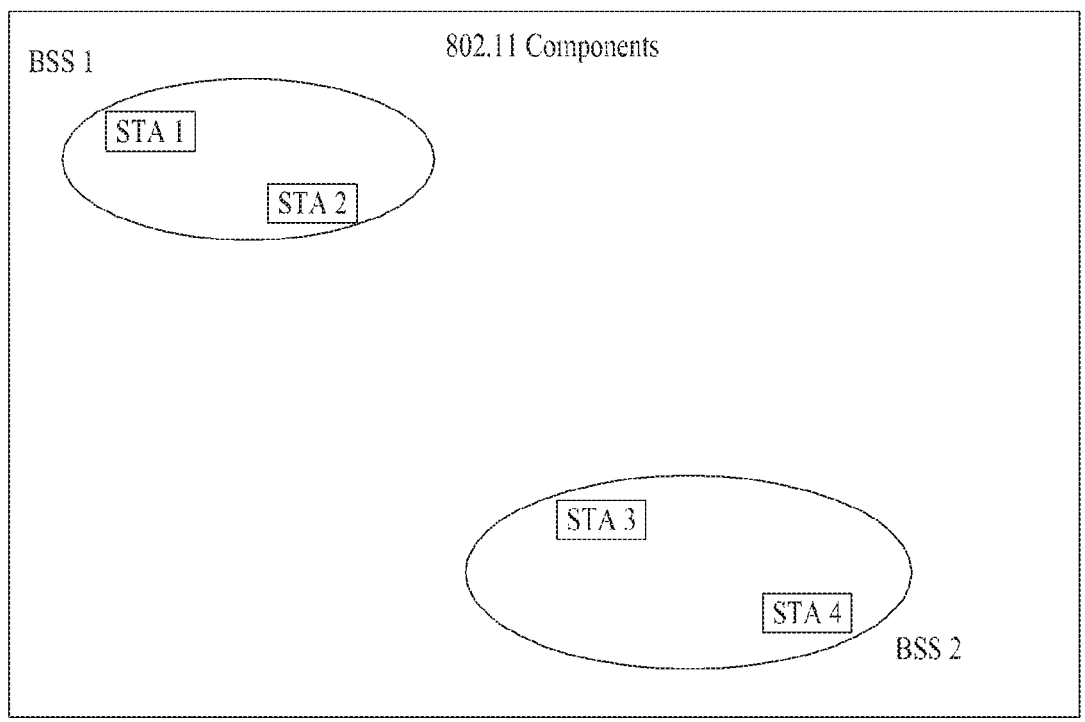
FIG. 1 is a diagram illustrating an exemplary configuration of a Wireless Local Area Network (WLAN) system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
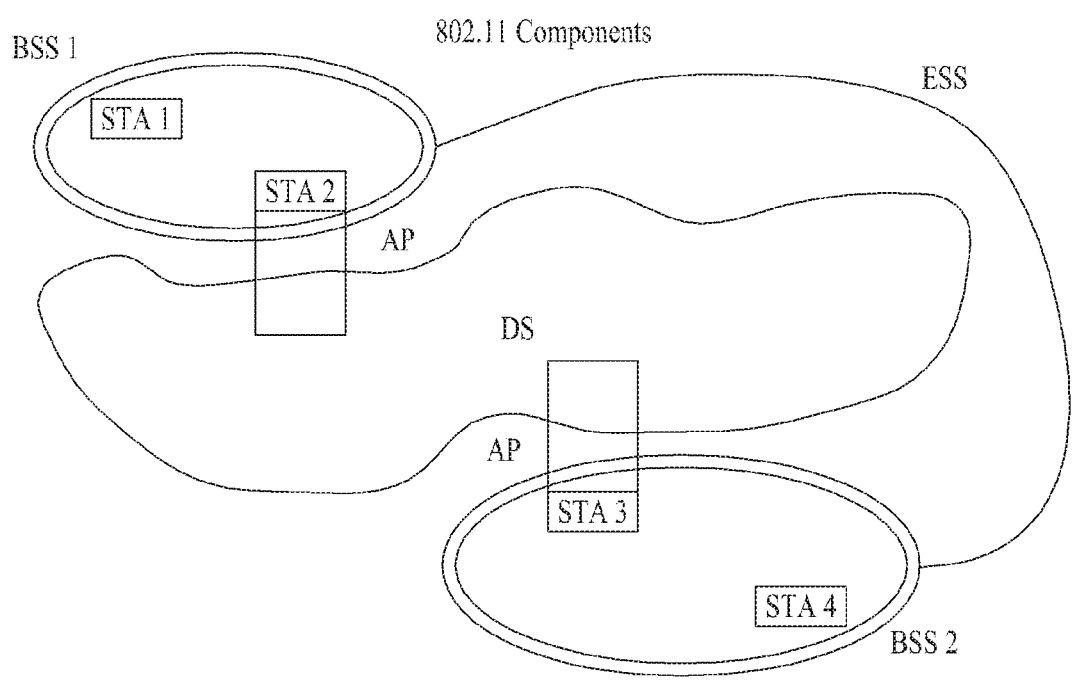
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Now, a collision detection scheme in a WLAN system will be described based on the above description.

Because various factors affect a channel in a wireless environment as described before, a transmitter is not capable of detecting a collision accurately. Accordingly, IEEE 802.11 has introduced a Distributed Coordination Function (DCF) being a Carrier Sense Multiple Access/Collision Avoidance (CSMA/CA) mechanism.

Figure 3:
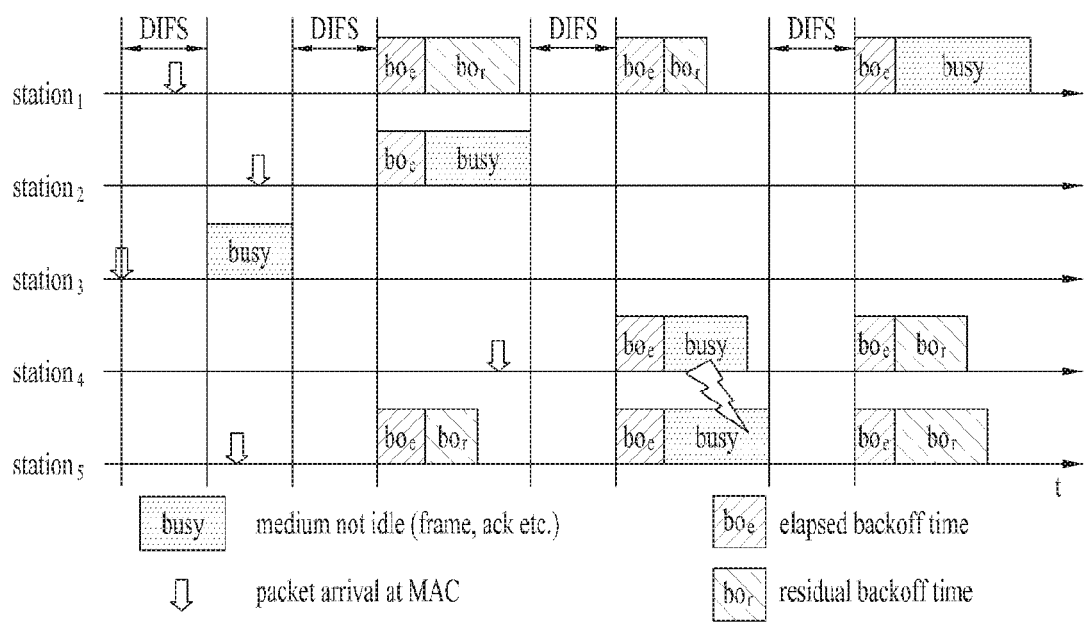
FIG. 3 is a diagram illustrating a Distributed Coordinated Function (DCF) mechanism in a WLAN system.

FIG. 3 illustrates a DCF mechanism in a WLAN system.

According to the DCF mechanism, STAs having transmission data perform Clear Channel Assessment (CCA) by sensing a medium during a specific duration (e.g., DCF Inter-Frame Space (DIFS)) before they transmit the data. If the medium is idle, an STA may transmit its data on the medium. On the contrary, if the medium is busy, the STA may transmit its data after further waiting a random backoff period, on the assumption that a plurality of STAs are waiting to use the medium. The random backoff period enables collision avoidance because each STA has a different backoff interval in probability and thus a different transmission time on the assumption that a plurality of STAs are to transmit data. Once one STA starts transmission, the other STAs may not use the medium.

A random backoff time and a random backoff procedure will be described in brief.

If a specific medium transitions from a busy state to an idle state, a plurality of STAs start to prepare for data transmission. To minimize collision, each STA selects a random backoff count and waits for as long a slot time period as the selected backoff count. The random backoff count is a pseudo-random integer and selected from a range of uniformly distributed values, 0 to CW. CW represents 'contention window'.

Although the CW parameter is initially set to CWmin, it is doubled upon transmission failure. For example, in the case where an ACK for a transmitted frame is not received, it may be determined that collision has occurred. If the CW value reaches CWmax, the STA maintains CWmax until the data transmission is successful. If the data transmission is successful, the CW value is reset to CWmin. Preferably, CW, CWmin, and CWmax are maintained to be $2^n-1$, for the convenience of configuration and operation.

When the random backoff procedure starts, the STA selects a random backoff count from the range of the values 0 to CW and continuously monitors the medium while counting down backoff slots according to the random backoff count. If the medium gets busy, the STA discontinues the count-down. When the medium becomes idle, the STA resumes the count-down of the remaining backoff slots.

Referring to FIG. 3, in the case where a plurality of STAs have data to be transmitted, STA3 may immediately transmit a data frame because the medium is idle during a DIFS, whereas the other STAs wait until the medium is idle. Since the medium has been busy for some time, a plurality of STAs may wait for an opportunity to use the medium. Therefore, each STA selects a random backoff count. Herein, STA2 selects a smallest backoff count and thus transmits a data frame in FIG. 3.

After STA2 completes the transmission, the medium gets idle. Then the STAs resume the count-down of the remaining backoff intervals. In FIG. 3, STA5, which has a second-smallest random backoff count and discontinued its count-down while the medium is busy, counts down the residual backoff slots and starts to transmit a data frame. However, the residual backoff time of STA5 happens to be equal to that of STA4. As a result, collision occurs between STA4 and STA5. Since, either STA4 or STA5 does not receive an ACK after the data transmission, STA4 and STA5 double CW values and select random backoff counts again.

As described before, the basics of CSMA/CA is carrier sensing. An STA uses physical carrier sensing and virtual carrier sensing to determine whether a DCF medium is busy or idle. A Physical layer (PHY) performs physical carrier sensing by energy detection or preamble detection. For example, if the PHY determines that a receiver has measured a voltage level or has read a preamble, it may determine that the medium is busy. In virtual carrier sensing, data transmission of other STAs is prevented by setting a Network Allocation Vector (NAV). This is done by means of a value of a Duration field in a MAC header. Meanwhile, a robust collision detection mechanism has been introduced to reduce the probability of collision. The reason for introducing the robust collision detection mechanism will be described with reference to the following two examples. For the convenience of description, it is assumed that a carrier sensing range is identical to a transmission range.

Figure 4:
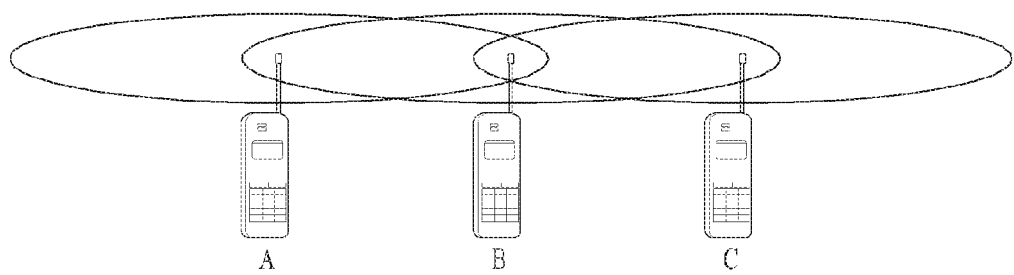
FIGS. 4 and 5 are exemplary diagrams describing problems encountered with a conventional collision resolution mechanism.
Figure 5:
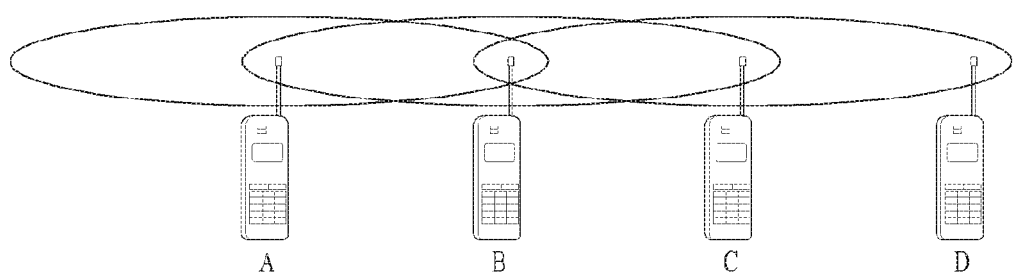

FIGS. 4 and 5 are exemplary diagrams describing problems encountered with a conventional collision resolution mechanism.

Specifically, FIG. 4 is a diagram describing a hidden node issue. In FIG. 4, STA A is communicating with STA B, and STA C has information to be transmitted. Specifically, STA C is likely to determine that a medium is idle during carrier sensing before transmitting data to STA B, although STA A is transmitting information to STA B. Collision occurs because STA B receives information from STA A and STA C simultaneously. Herein, it may be said that STA A is a hidden node to STA C.

FIG. 5 is a diagram describing an exposed node issue. In FIG. 5, STA B is transmitting data to STA A. STA C performs carrier sensing and determines that a medium is busy due to transmission of STA B. Therefore, although STA C has information to be transmitted to STA D, STA C should wait unnecessarily until the medium is idle since the medium is sensed as busy. That is, even though STA A is actually located out of the transmission range of STA C, STA C does not transmit information. Herein, STA C is an exposed node to STA B.

To efficiently utilize a collision avoidance mechanism in the above situation, short signaling packets such as Request To Send (RTS) and Clear To Send (CTS) frames may be introduced, so that neighboring STAs may determine by overhearing whether information is transmitted between two STAs. That is, if a transmitting STA transmits an RTS frame to a receiving STA, the receiving STA may indicate to its neighboring STAs that it will receive data by transmitting a CTS frame to the neighboring STAs.

Figure 6:
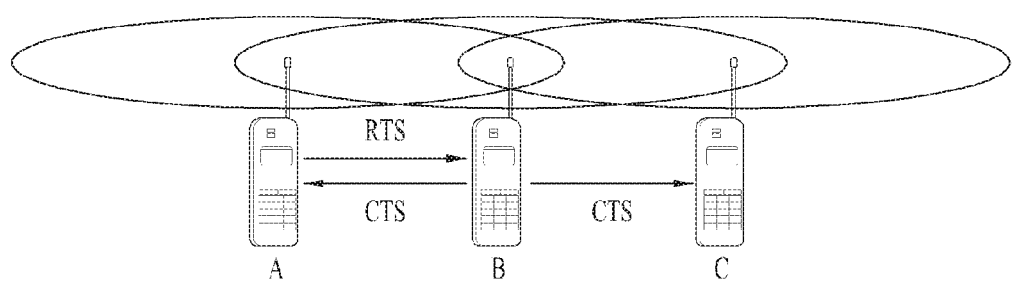
FIG. 6 is a diagram illustrating a mechanism of solving a hidden node issue using a Ready To Send (RTS)/Clear To Send (CTS) frame.

FIG. 6 illustrates a mechanism of solving the hidden node issue.

In FIG. 6, both STA A and STA C are to transmit data to STA B. If STA A transmits an RTS frame to STA B, STA B transmits a CTS frame to its neighboring STAs, both STA A and STA C. As a consequence, STA C waits until STA A and STA B complete data transmission, thus avoiding collision.

Figure 7:
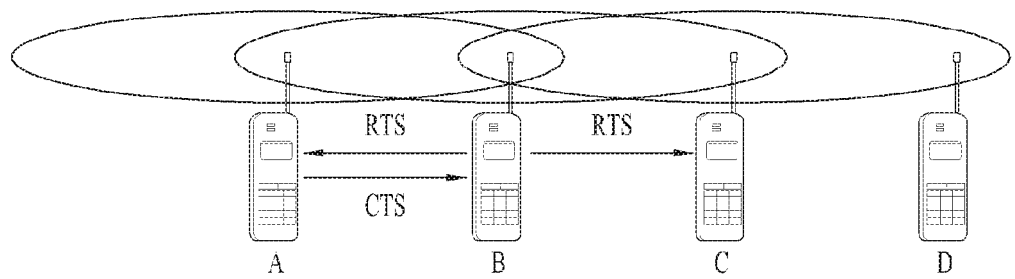
FIG. 7 is a diagram illustrating a mechanism of solving an exposed node issue using an RTS/CTS frame.

FIG. 7 illustrates a mechanism of solving the exposed node issue using an RTS/CTS frame.

It is noted from FIG. 7 that since STA C overhears RTSC/CTS transmission between STA A and STA B, transmission of STA C to STA D does not cause collision. That is, STA B transmits an RTS frame to all neighboring STAs, and only STA A having actual transmission data transmits a CTS frame. Since STA C receives only the RTS frame without receiving the CTS frame, STA C may be aware that STA A is outside the CS range of STA C.

Figure 8:
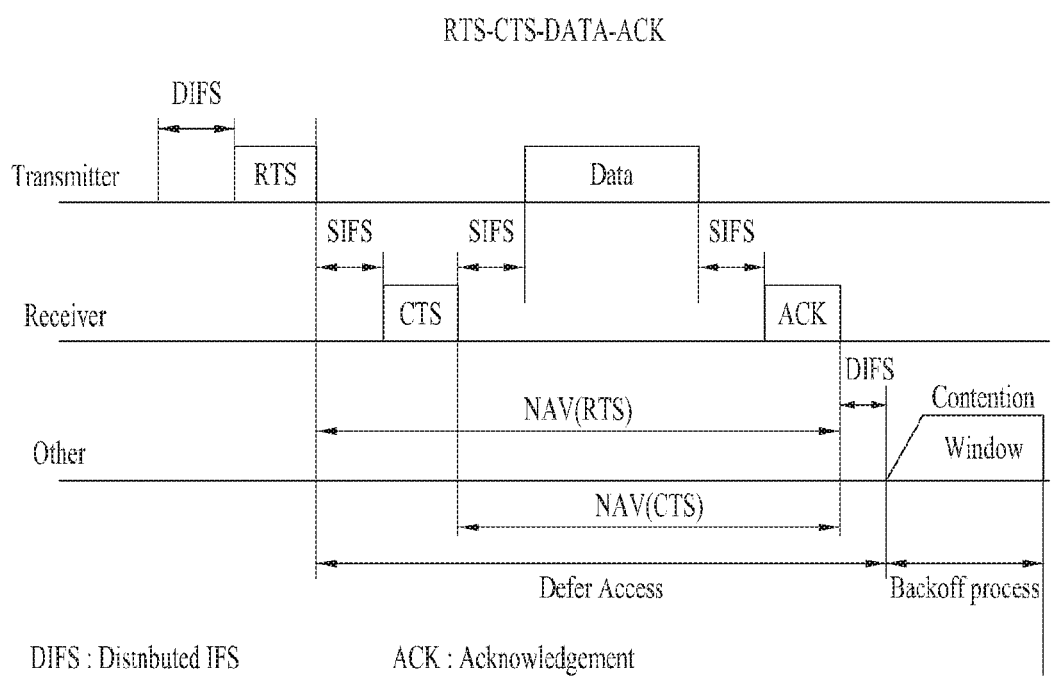
FIG. 8 is a diagram illustrating a specific operation method using an RTS/CTS frame.

FIG. 8 is a diagram illustrating a method for operating using the above-described RTS/CTS frame.

In FIG. 8, a transmitting STA may transmit an RTS frame to a receiving STA after a DIFS. Upon receipt of the RTS frame, the receiving STA may transmit a CTS frame to the transmitting STA after a Short IFS (SIFS). Upon receipt of the CTS frame from the receiving STA, the transmitting STA may transmit data after an SIFS, as illustrated in FIG. 8. Upon receipt of the data, the receiving STA may transmit an ACKnowledgement (ACK) in response to the received data.

Meanwhile, an STA, which has received the RTS/CTS frame of the transmitting STA among neighbor STAs, may determine whether a medium is busy according to reception or non-reception of the RTS/CTS frame, as described before with reference to FIGS. 6 and 7, and may set a Network Allocation Vector (NAV) accordingly. Upon expiration of a time period indicated by the NAC, the collision resolution operation described with reference to FIG. 3 may be performed after a DIFS.

In the legacy WLAN system, a frame is transmitted in a contention-based manner according to a predetermined criterion (e.g., DCF, Enhanced Distributed Channel Access (EDCA), and the like) irrespective of an AP or a non-AP STA. For example, in a state where 100 non-AP STAs are associated with a single AP, every STA transmits a frame equally by contention irrespective of an AP or a non-AP STA. In an actual WLAN environment, the amount of data that an AP transmits to all STAs is larger than or approximate to the amount of data that every STA transmits to the AP. Accordingly, if the AP has data to be transmitted to a number of STAs and many STAs have transmission data, contention may be heated or many collisions may occur. As a consequence, as the AP transmits data to the last STA with a time delay, a user's Quality of Service (QoS) may not be satisfied, or a packet transmission timeout may occur, thus causing discarding of a packet. This situation may be fatal to real-time service such as audio/video streaming.

Moreover, a large amount of data transmitted by the AP may delay transmissions of STAs and thus increase the number of STAs attempting frame transmission. In this case, UL transmissions are suddenly concentrated after a DL transmission, resulting in lots of collisions from hidden nodes as described before.

In this high-density WLAN environment, the present invention proposes that an AP operates a DL oriented channel to reduce DL-UL collision.

Figure 9:
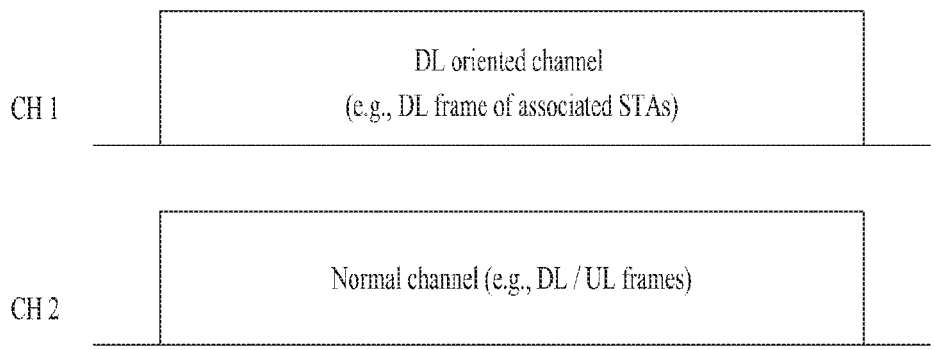
FIG. 9 is a diagram describing the concept of a downlink oriented channel in a WLAN system according to an embodiment of the present invention.

FIG. 9 is a diagram describing the concept of a DL oriented channel in a WLAN system according to an embodiment of the present invention.

As illustrated in FIG. 9, the embodiment of the present invention proposes that when one or more channels are available to an AP, the AP configures one or more channels as DL oriented channels for transmitting data to STAs associated with the AP. In FIG. 9, CH 1 represents a DL oriented channel according to the embodiment, and CH 2 represents a normal channel.

The AP should have normal channels for association of STAs or for supporting legacy STAs. That is, it is assumed that an STA is associated with the AP and transmits and receives data on CH 2 in the same manner as in the legacy WLAN system.

Meanwhile, it is proposed that the AP transmits data to STAs associated with the AP on the DL oriented channel, CH 1 introduced according to the embodiment, without the afore-described contention with UL data transmissions, and receives UL data on the normal channel CH 2. The DL oriented channel is different from the normal channel in that UL data transmission is not performed on the DL oriented channel. However, a control signal (e.g., ACK/Negative ACK (ACK/NACK) of an STA related to data transmission of the AP may be transmitted on the DL oriented channel.

A description will be given below of an operation of an active-mode STA using the above-described DL oriented channel.

Figure 10:
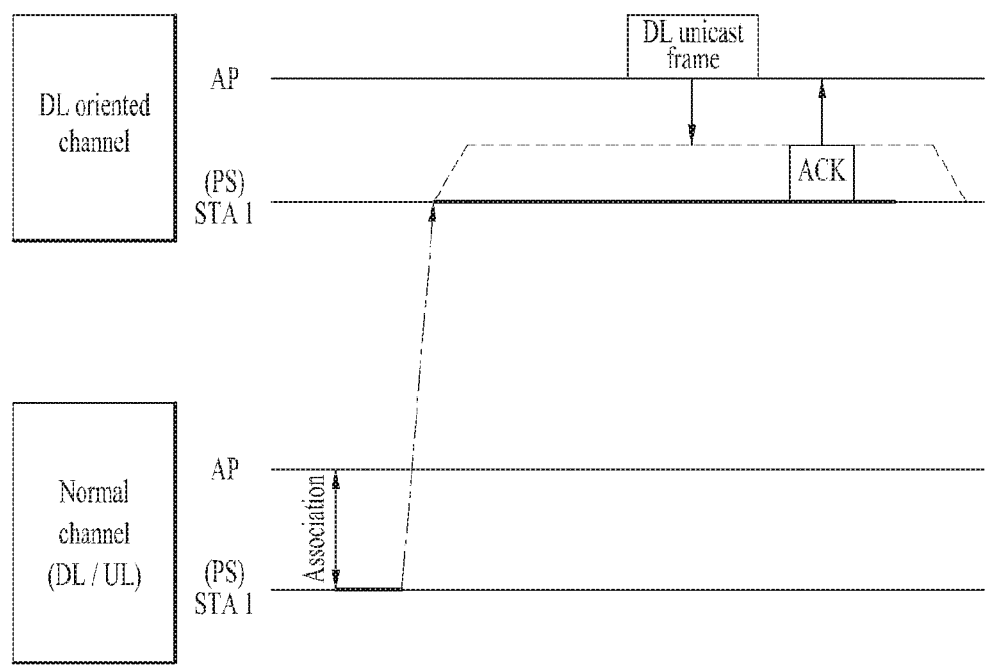
FIG. 10 is a diagram illustrating a method of operating using a downlink oriented channel by an active-mode Station (STA) according to an embodiment of the present invention.

FIG. 10 is a diagram illustrating a method of operating using a DL oriented channel by an active-mode STA according to an embodiment of the present invention.

According to the embodiment, STA 1 may be associated with an AP conventionally. STA 1 may use a normal channel during the association. Meanwhile, if STA 1 associated with the AP operates in active mode, the AP may generally perform the afore-described CCA by switching to a DL oriented channel according to the embodiment. If it turns out from the CCA result that the AP is allowed to transmit data to STA 1, the AP transmits data to STA 1 on the DL oriented channel. Thus, STA 1 may transmit an ACK on the DL oriented channel to the AP.

Now, a description will be given of an association procedure with an, a Power Save (PS) mode operation of an STA, and an operation method of an STA/AP along with the introduction of the afore-described DL oriented channel AP in a WLAN system, based on the above description.

Figure 11:
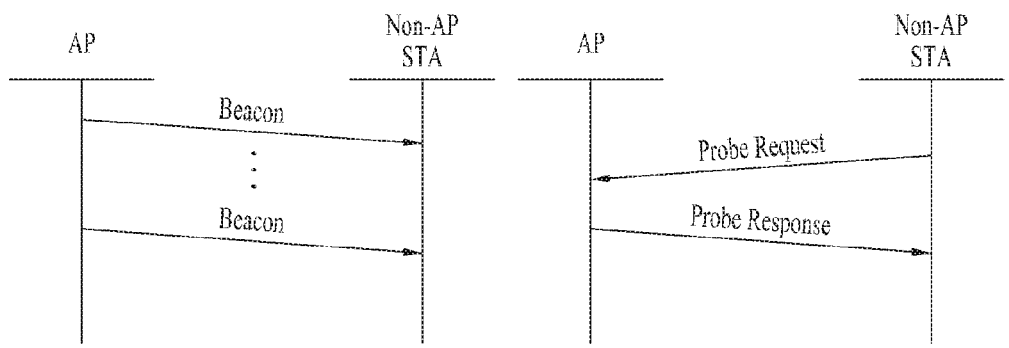
FIG. 11 is a diagram illustrating a signal flow for a scanning procedure of an STA in a WLAN system.

FIG. 11 is a diagram illustrating a signal flow for a scanning procedure of an STA in a WLAN system.

In the WLAN system, there are two types of scanning procedures, passive scanning (the left signal flow of FIG. 11) and active scanning (the right signal flow of FIG. 11).

Passive scanning is performed through a Beacon frame broadcast periodically by an AP. In general, a WLAN AP broadcasts a Beacon frame every 100 msec, and the Beacon frame carries information about a current network. To acquire the information, a non-AP STA awaits reception of the Beacon frame passively on a predetermined channel. Upon acquisition of the network information from the received Beacon frame, the non-AP STA completes scanning of the channel. Passive scanning offers the benefit of small overall overhead because a non-AP STA has only to receive a Beacon frame without the need for transmitting another frame. However, passive scanning increases a scanning time in proportion to a Beacon frame period.

In active scanning, a non-AP STA broadcasts a Probe Request frame actively on a predetermined channel, requesting network information from all APs receiving the Probe Request frame. Upon receipt of the Probe Request frame, an AP transmits network information to the non-AP STA by a Probe Response frame after waiting a random time in order to prevent frame collision. The non-AP STA complete the scanning procedure by receiving the Probe Response frame and acquiring the network information from the Probe Response frame.

Active scanning is advantageous in that scanning is completed for a relatively short time. However, the need for an additional frame sequence increases overall network overhead.

Figure 12:
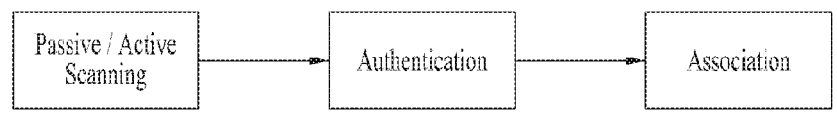
FIG. 12 is a diagram illustrating an operation for performing an association procedure with an AP by an STA in a WLAN system.

FIG. 12 is a diagram illustrating an operation for performing an association procedure with an AP by an STA in a WLAN system.

After completing the scanning procedure as illustrated in FIG. 11, the non-AP STA selects a network according to its own criterion and then performs authentication with an AP of the selected network. The authentication procedure involves 2-way handshaking. After the non-AP STA and the AP mutually authenticate each other in the authentication procedure, they are associated with each other, as illustrated in FIG. 12.

The association procedure involves 2-way handshaking. The non-AP STA first transmits an Association Request frame to the AP. The transmitted Association Request frame includes capability information about the non-AP STA. The AP determines whether to support the non-AP STA based on the capability information. After the determination, the AP transmits, to the non-AP STA, an Association Response frame including information indicating whether the association request is accepted or rejected, a reason for the acceptance or rejection, and capability information indicating capabilities supported by the AP.

If the association is successful, transmission and reception are performed normally between the AP and the non-AP STA. On the contrary, if the association is failed, the non-AP STA may re-try the association procedure or attempt to associate with another AP, based on the reason for the association failure.

Figure 13:
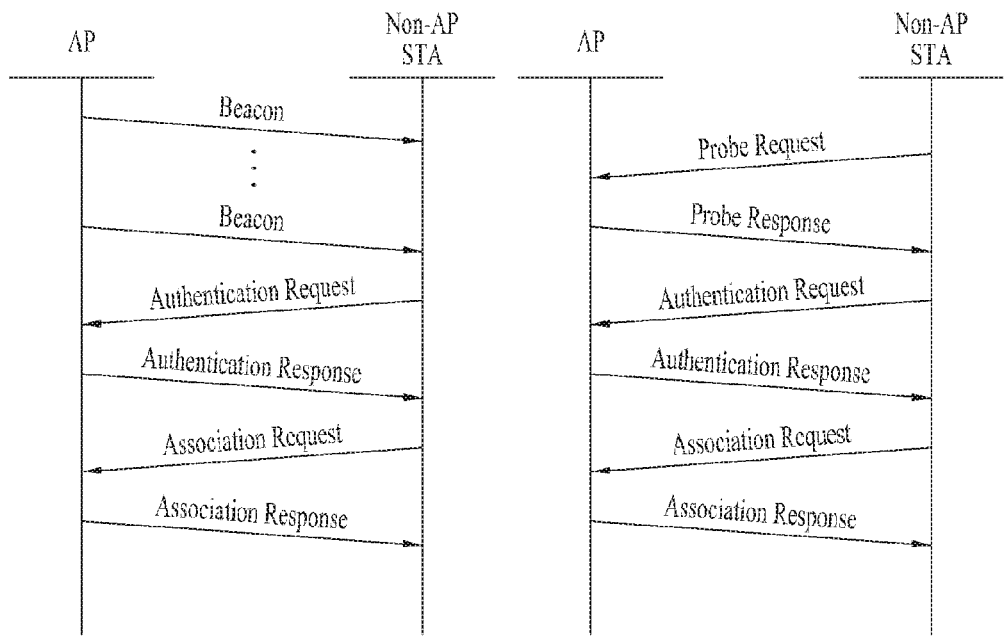
FIG. 13 is a diagram illustrating an overall signal flow for scanning, authentication, and association procedures.

FIG. 13 is a diagram illustrating an overall signal flow for scanning, authentication, and association procedures.

Specifically, the left signal flow of FIG. 13 depicts the authentication and association procedures after passive scanning as depicted by the left flow of FIG. 11, and the right signal flow of FIG. 13 depicts the authentication and association procedures after active scanning as depicted by the right flow of FIG. 11.

A PS mode operation of an STA in a WLAN system will be described below.

The IEEE 802.11 standard defines a power saving mechanism to lengthen the lifetime of a WLAN STA. To save power, a WLAN STA operates in two modes, active mode and sleep mode.

The active mode refers to a state in which in the STA is capable of performing normal operations including frame transmission and reception, channel scanning, and the like. On the other hand, the STA cannot perform frame transmission and reception, and channel scanning because it reduces power consumption to an extreme level in the sleep mode. The STA basically stays in the sleep mode and, when needed, switches to the active mode, thus reducing power consumption.

As the STA operates longer in the sleep mode, the STA consumes less power, thus lengthening its lifetime. However, the STA may not stay unconditionally long in the sleep mode because it is impossible to transmit or receive a frame in the sleep mode. In the presence of a frame to be transmitted in the sleep mode, the STA switches to the active mode and then transmits the frame in the active mode. On the other hand, if the STA is in the sleep mode and an AP has a frame to be transmitted to the STA, the STA is unable to receive the frame and does not know the presence of a frame to be received. Accordingly, the STA should switch to the active mode from time to time to determine the presence or absence of a frame to receive or to receive a frame in the presence of the frame to receive. The AP should indicate the presence or absence of a frame for the STA to the STA in time.

To determine whether there is a frame to receive, the STA periodically wakes up from the sleep mode and receives a Beacon frame from the AP. The AP indicates the presence or absence of a frame to be received to each STA using a Traffic Indication Map (TIM) element of a Beacon frame. There are two types of TIM elements by large, TIM and Delivery TIM (DTIM). The TIM is used to indicate a unicast frame and the DTIM is used to a multicast/broadcast frame.

If the STA determines that the AP has a frame to transmit to the STA from the TIM element of the Beacon frame, the STA transmits a Power Save Poll (PS-Poll) frame by contending. Upon receipt of the PS-Poll frame, the AP selects an immediate response or a deferred response under circumstances.

Figure 14:
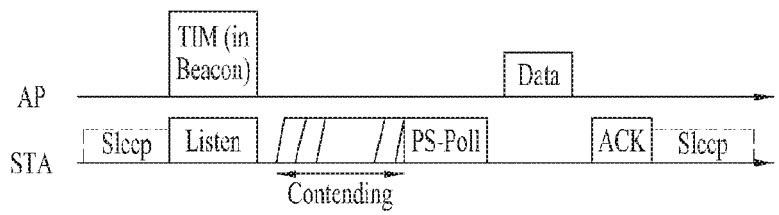
FIGS. 14 and 15 are diagrams illustrating operation methods of an AP for transmitting an immediate response and a deferred response to a Power Saving (PS) Poll (PS-Poll) signal transmitted by an STA.
Figure 15:
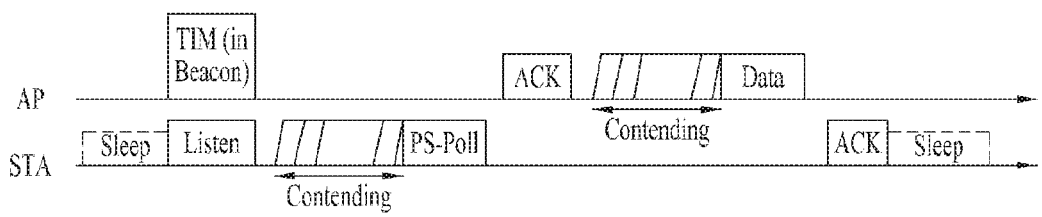

FIGS. 14 and 15 are diagrams illustrating operation methods of an AP for transmitting an immediate response and a deferred response to a Power Saving (PS) Poll signal transmitted by an STA.

In the case of the immediate response, the AP transmits a data frame an SIFS after receiving a PS-Poll frame as illustrated in FIG. 14. If the STA receives the data frame successfully, the STA transmits an ACK frame after an SIFS and then switches to the sleep mode.

If the AP does not prepare a data frame to be transmitted to the STA during the SIFS after receiving the PS-Poll frame, the AP selects a deferred response. As illustrated in FIG. 15, the AP first transmits an ACK frame to the STA. Then, if the AP prepares the data frame, the AP transmits the data frame to the STA after contention. Upon successful receipt of the data frame, the STA transmits an ACK frame to the AP and switches to the sleep mode.

Figure 16:
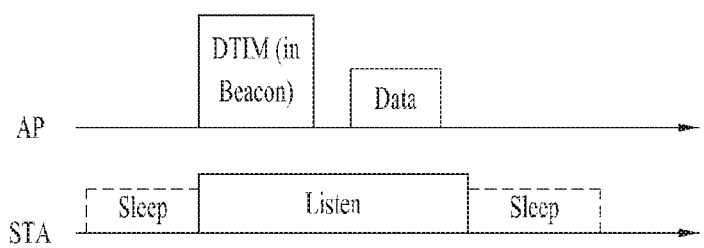
FIG. 16 is a diagram illustrating a Power Save (PS) mode operation using a Delivery Traffic Indication Map (DTIM).

FIG. 16 is a diagram illustrating a PS mode operation using a DTIM.

Unlike a TIM, a DTIM indicates a multicast/broadcast frame. Thus, the AP directly transmits a data frame after a Beacon frame without transmitting/receiving a PS-Poll frame, as illustrated in FIG. 16. All of corresponding STAs may receive the data frame in the active mode.

During association with the AP, the STA is assigned an Association ID (AID). An AID is used as a unique ID of each STA within one BSS. The AID may be one of 1 to 2007 in the current WLAN system. Although 14 bits are allocated to AIDs and thus up to 16383 is available as an AID, the values of 2008 to 16383 are reserved.

Now, a description will be given of how the above-described PS mode operation is performed along with the introduction of a DL oriented channel described before with reference to FIGS. 9 and 10.

After performing the afore-described association procedure with an AP on a normal channel, an STA(s) may operate in the following manners.

Embodiment 1

According to an embodiment of the present invention, after an STA is associated with an AP, the STA may transmit a frame including a Power save Mode (PM) field set to 1 to the AP to enter the PS mode, and then operate in the PS mode on a normal channel.

For example, a general PS-mode STA may wake up in every listening interval on a normal channel, receive a TIM, and determine whether an AP has a DL frame to be transmitted to the STA. If the TIM includes a traffic indication for the STA, the STA may attempt to transmit a PS-Poll frame to the AP, determining that the AP has a DL frame to be transmitted to the STA. The STA may receive an ACK from the AP an SIFS after transmitting the PS-Poll frame. Meanwhile, upon receipt of the ACK, the STA may switch to a DL oriented channel in order to receive the DL frame.

Upon receipt of the DL frame on the DL oriented channel, the STA may transmit an ACK to the AP. When the DL frame reception on the DL oriented channel is completed, the STA may switch to the normal channel and thus return to the PS mode.

If the AP has a small amount of transmission data, the AP may transmit the DL data on the normal channel (or legacy/UL channel) to the STA in order to reduce the switching overhead of the STA or if the DL oriented channel is very busy and the normal channel is idle. The AP may transmit this DL traffic transmission channel information to the STA.

In an embodiment of the present invention, it is proposed that an AP transmits DL traffic channel information to an STA in a PS-Poll procedure. That is, when the AP transmits a response frame (ACK) to a PS-Poll frame, the AP may notify the STA whether DL data will be transmitted on a normal channel or a DL oriented channel. While DL traffic transmission channel information is transmitted as an indicator indicating a DL oriented channel or a normal channel in the embodiment, by way of example, the DL traffic transmission channel information may be represented as a channel number or relative position information. For simplicity of description, the DL traffic transmission channel information will be represented simply as an indicator in the following description.

Figure 17:
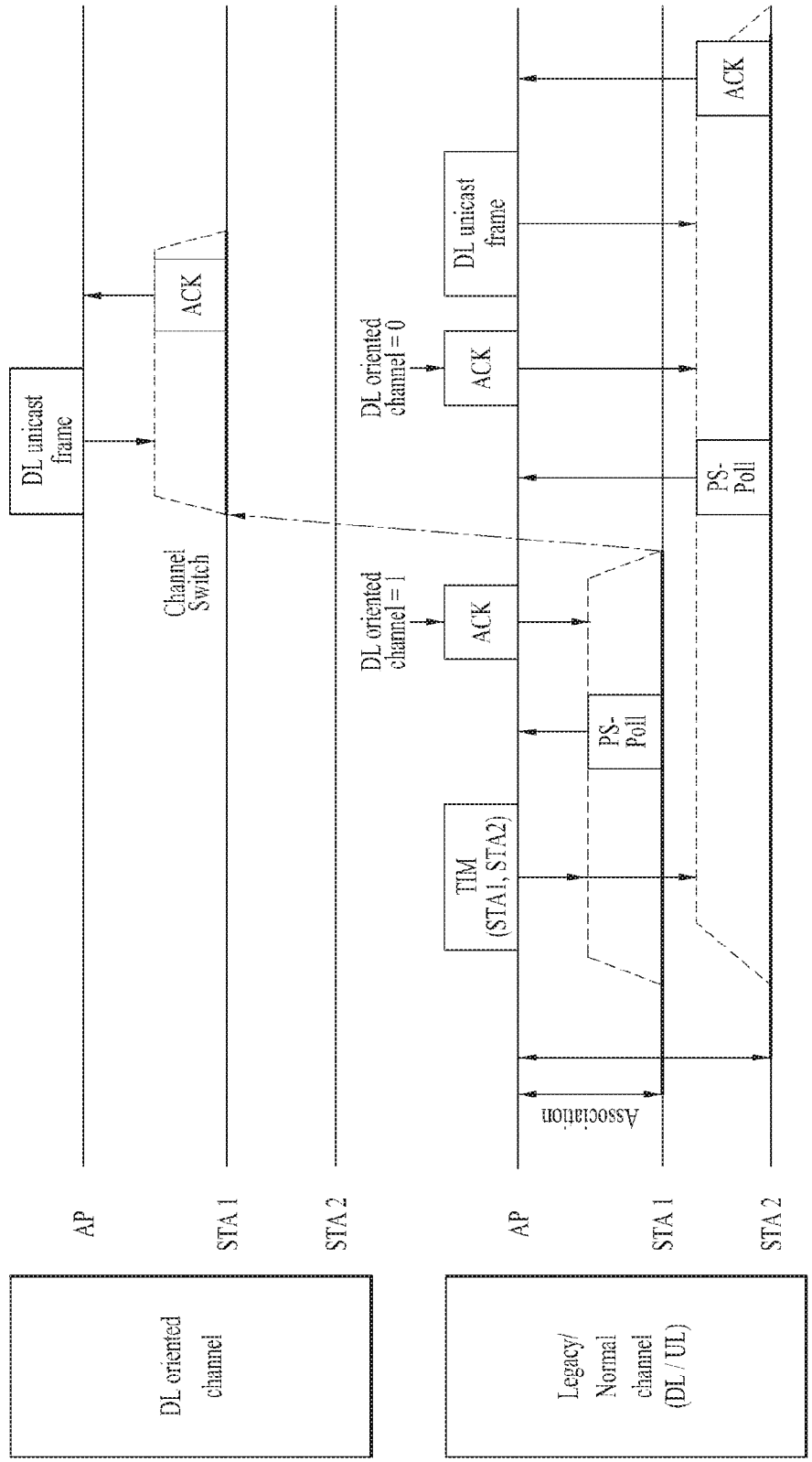
FIG. 17 is a diagram illustrating a method for operating in a PS mode by an STA according to an embodiment of the present invention.

FIG. 17 is a diagram illustrating a method for operating in a PS mode by an STA according to an embodiment of the present invention.

In FIG. 17, after associating with an AP, STA1 and STA2 may enter the PS mode and stay on a legacy channel. STA1 and STA2 may receive a TIM and determine whether there is DL data for STA1 and STA2 based on the TIM. If the TIM includes a DL data indication for STA1/STA2, STA1/STA2 may transmit a PS-Poll signal to the AP and receive an ACK in response to the PS-Poll signal.

In the example of FIG. 17, because an ACK for STA1 includes information indicating that data will be transmitted on a DL oriented channel (DL oriented channel=1), STA1 may switch to the DL oriented channel and receive the DL data, after receiving the ACK. On the other hand, an ACK for STA2 includes information indicating that data will be transmitted on the current legacy channel (DL oriented channel=0). Therefore, STA2 may receive a DL frame on the current normal channel (or legacy channel) after receiving the ACK.

After completing the DL frame reception on the DL oriented channel, STA1 may switch to the normal channel and thus operate in the PS mode again. Herein, STA1 may enter the PS mode implicitly (e.g., if EOSP=1 or additional data=0 in the DL frame received on the DL oriented channel, STA1 receives the data, transmits an ACK, and then switches to the normal channel), or explicitly (e.g., STA1 switches to the normal channel in a similar manner to for conventionally entering the PS mode, transmits a frame with a PM bit set to 1, receives a Beacon frame, and then enters the PS mode).

In the absence of any special indication information in an ACK, it may be determined whether to transmit a DL frame on a DL oriented channel or a legacy channel according to the capabilities of an STA, after a TIM and a PS-Poll frame are exchanged in an embodiment of the present invention. If STA1 is an STA supposed to receive a DL frame on a DL oriented channel in the above example, upon receipt of an ACK after transmitting a PS-Poll frame, if the ACK indicates the presence of data for the STA at the AP, the STA may switch to the DL oriented channel and receive a DL frame on the DL oriented channel. In the case of an STA supposed to receive a DL frame on a normal (legacy) channel, upon receipt of an ACK after transmitting a PS-Poll frame, if the ACK indicates the presence of data for the STA at the AP, the STA may receive a DL frame/data on the current channel, that is, the normal (legacy) channel.

Meanwhile, it may be determined whether an STA will receive data from an AP on a DL oriented channel or a normal channel by prior negotiations between the AP and the STA, instead of the above-described PS-Poll frame exchange in an embodiment of the present invention. A different channel may be selected for each STA according to the result of negotiations between the AP and the STA.

Embodiment 2

In another embodiment of the present invention, it is proposed that an AP periodically transmits a DL oriented channel TIM to indicate the presence or absence of DL traffic to PS-mode STAs. A TIM may be periodically transmitted to STAs by a broadcast frame such as a Beacon frame, a Short Beacon frame, or a TIM Broadcast frame, and the broadcast frame may include information (e.g., a time stamp, a changed sequence, an SSID, or the like) for HEW STAs, in addition to the TIM. An STA, which is to enter the PS mode, may transmit a frame indicating that it will enter the PS mode (PM bit=1) to an AP and then enter the PS mode. Subsequently, the STA may determine whether there is DL traffic to be transmitted to the STA by waking up in every listening interval for the STA, and receiving a TIM on a DL oriented channel.

If the TIM received on the DL oriented channel indicates DL traffic to be transmitted to the STA, the STA may switch to a normal channel, exchange a PS-Poll frame and an ACK frame with the AP, and receive a DL frame from the AP on the DL oriented channel.

Figure 18:
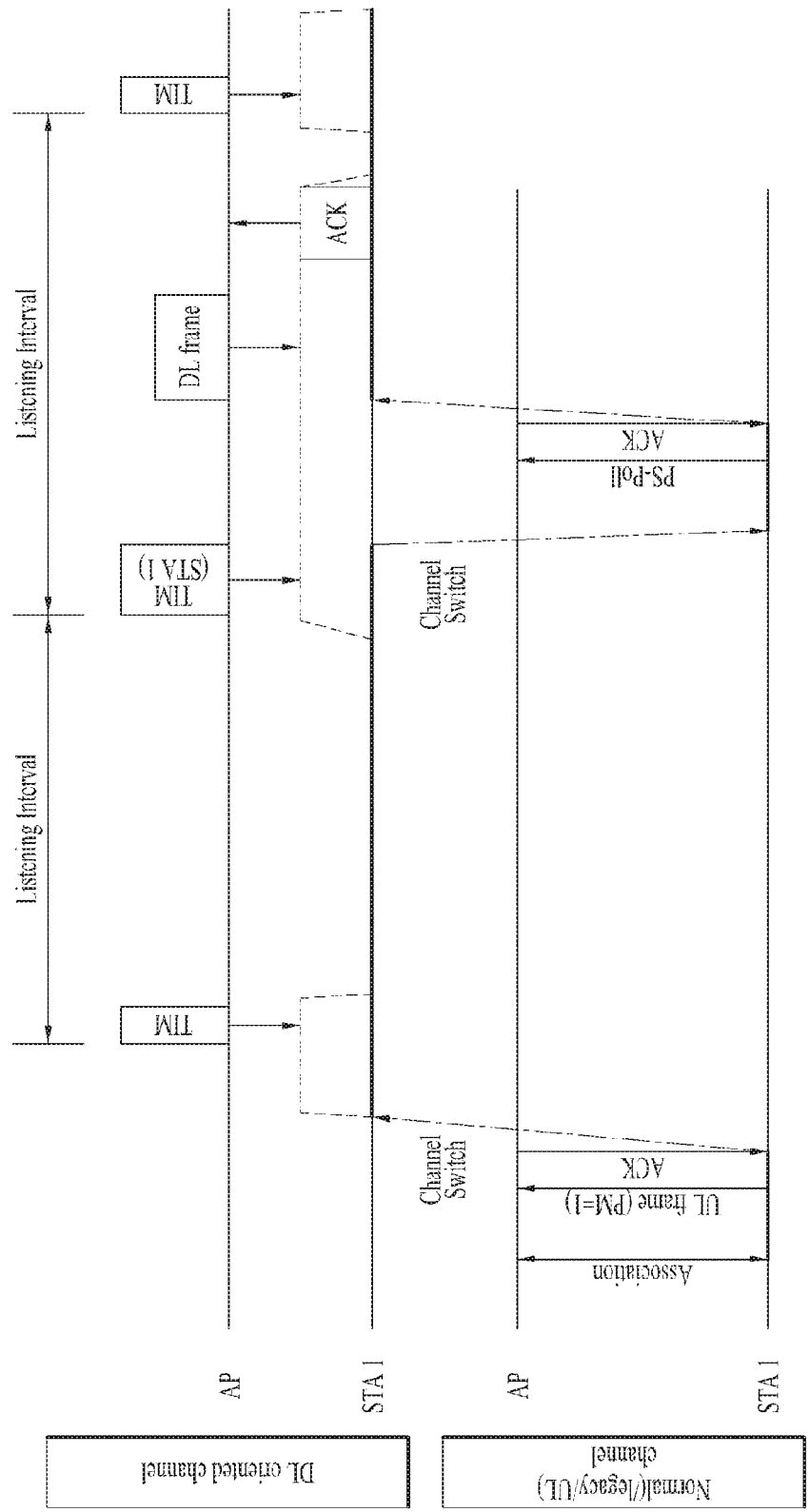
FIG. 18 is a diagram illustrating a method for operating in a PS mode by an STA according to another embodiment of the present invention.

FIG. 18 is a diagram illustrating a method for operating in a PS mode by an STA according to another embodiment of the present invention.

In the example of FIG. 18, STA1 which has entered the PS mode may wake up periodically in every listening interval and check a TIM on a DL oriented channel, to thereby determine the presence or absence of DL traffic for STA1. If the TIM indicates DL traffic for STA1, STA1 may switch to a normal channel, notifies the AP of the presence of DL traffic for STA1 by a PS-Poll frame, and then receive an ACK frame. Upon receipt of the ACK frame, the STA may switch to the DL oriented channel, and receive a DL frame. Upon completion of the DL frame reception, the STA may transition to the PS mode.

As in the foregoing Embodiment 1, the AP may transmit, to the STA, DL frame transmission channel information in a response frame (e.g., an ACK frame) to a PS-Poll frame in Embodiment 2.

In the above example, in the presence of DL traffic for the STA after receiving the TIM, the STA may attempt to receive a DL frame on the DL oriented channel without attempting to transmit a PS-Poll frame on the normal channel. The STA may determine whether to transmit the PS-Poll frame during association with the AP.

Commonly, if the PS-mode STA has a UL frame, the STA may switch to the normal channel and transmit the UL frame on the normal channel. After completing the UL frame transmission, the STA may switch to the DL oriented channel and thus operate again in the PS mode.

Figure 19:
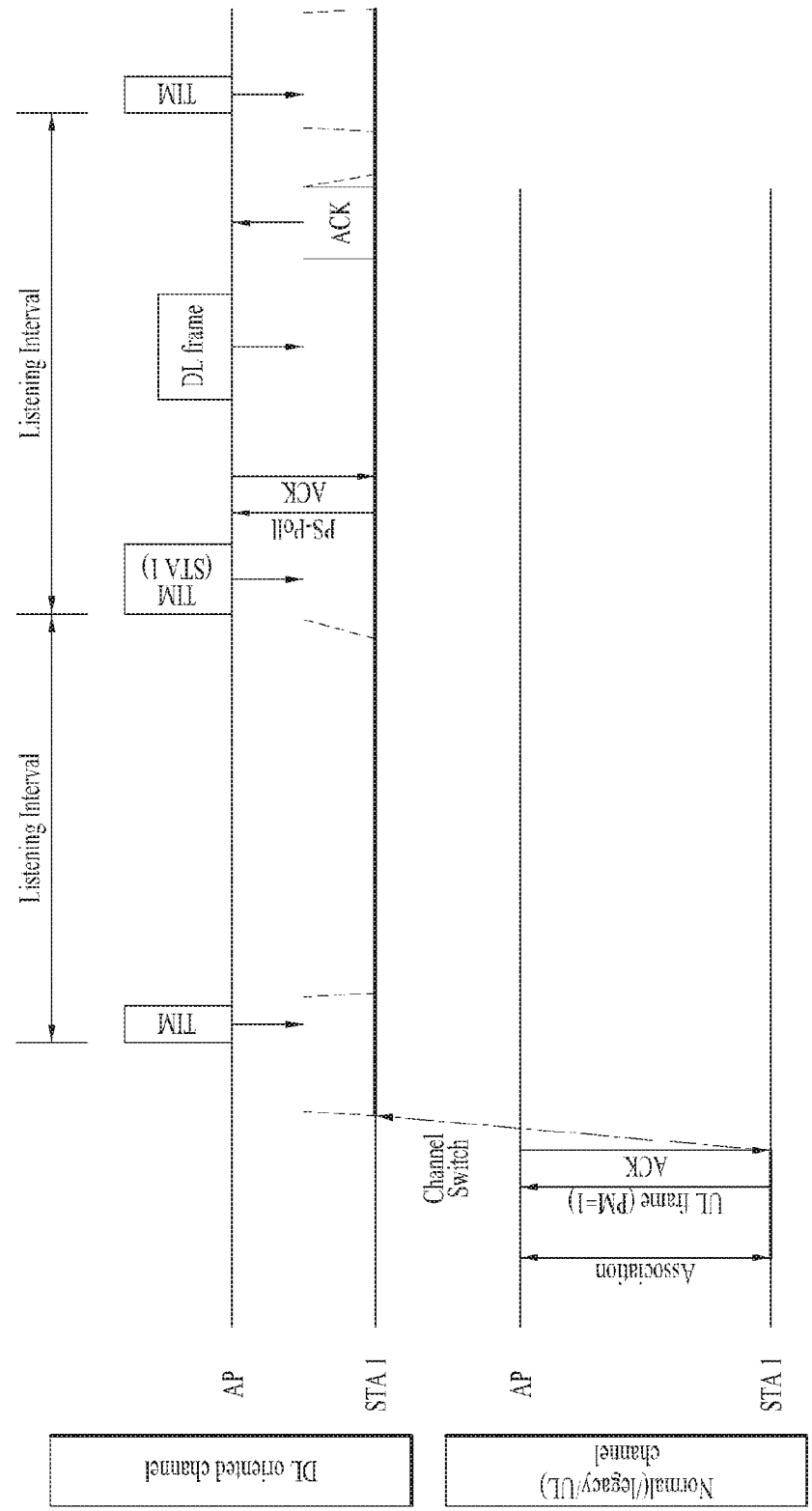
FIG. 19 is a diagram illustrating an example of receiving a TIM and transmitting a PS-Poll signal on a DL oriented channel according to another embodiment of the present invention.

FIG. 19 is a diagram illustrating an example of receiving a TIM and transmitting a PS-Poll signal on a DL oriented channel according to another embodiment of the present invention.

That is, when a TIM is received on the DL oriented channel, an STA indicated by the TIM (i.e., an STA corresponding to an AID bit set to 1) may be configured to transmit a PS-Poll signal on the DL oriented channel, as illustrated in FIG. 19.

In the example of FIG. 19, if a received TIM indicates STA1, STA1 may transmit a PS-Poll signal on the DL oriented channel and then receive an ACK frame or a DL frame immediately from the AP. FIG. 19 illustrates an example in which after receiving an ACK frame, STA1 receives a DL frame.

After transmitting the TIM, if the TIM indicates one or more STAs, the AP may defer DL frame transmission for a predetermined time. Or the AP may allocate a PS-Poll/Trigger frame interval to the STAs indicated by the TIM, and the STAs may transmit a PS-Poll/Trigger frame during the allocated PS-Poll/Trigger frame interval. The AP may transmit an ACK or data in response to the PS-Poll/Trigger frame during the PS-Poll/Trigger frame interval. After the PS-Poll/Trigger frame interval ends, the AP may transmit a DL fame to STAs (e.g., active-mode STAs) other than the STAs indicated by the TIM.

Figure 20:
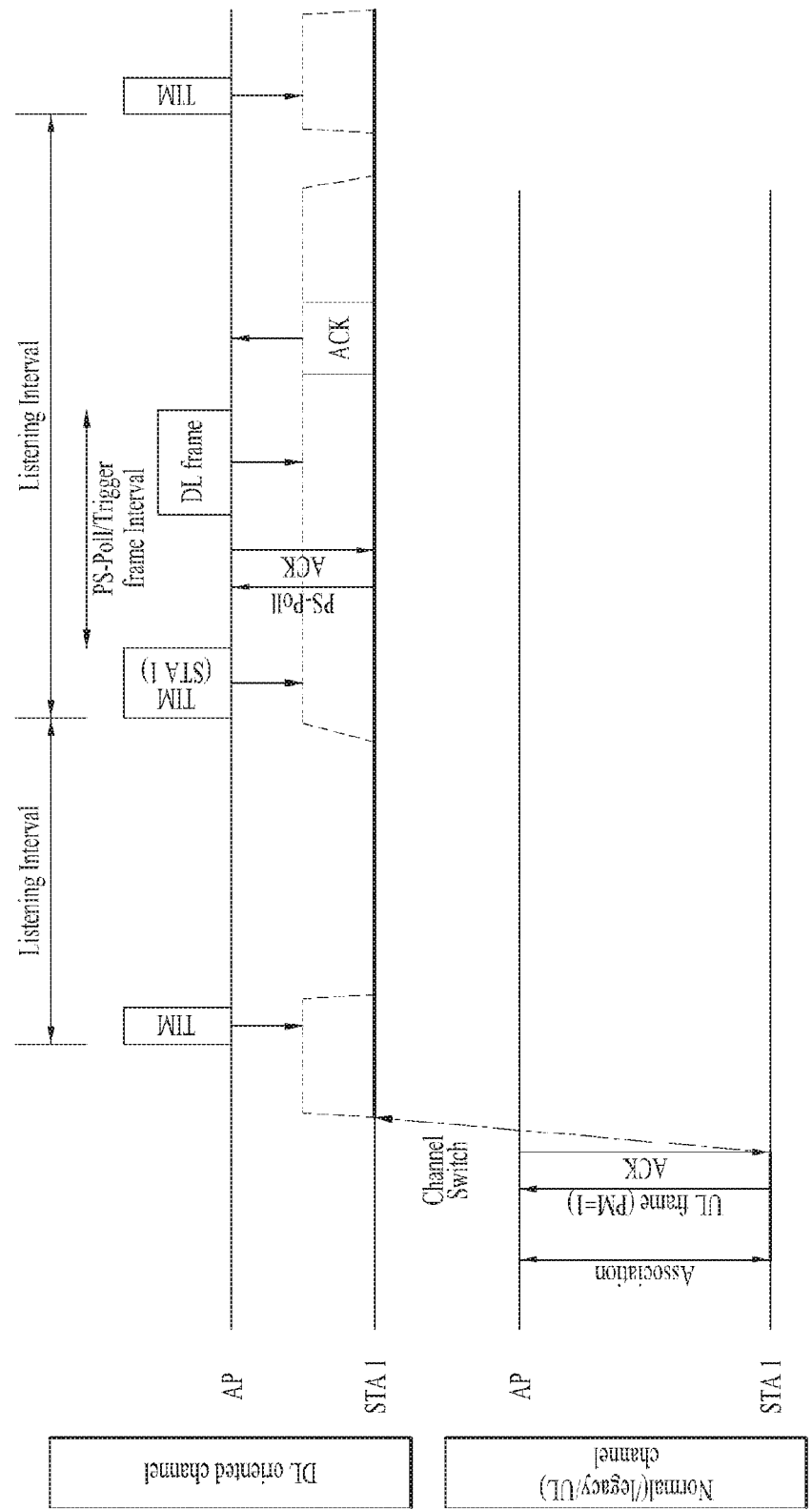
FIG. 20 is a diagram illustrating an example of setting a PS-Poll/Trigger frame interval according to an embodiment of the present invention.

FIG. 20 is a diagram illustrating an example of setting a PS-Poll/Trigger frame interval according to an embodiment of the present invention.

As illustrated in FIG. 20, the AP may allocate a PS-Poll/Trigger frame interval, and an STA may transmit a PS-Poll frame during the PS-Poll/Trigger frame interval. During the PS-Poll/Trigger frame interval, the AP may transmit ACK-data or data immediately to the STA that has transmitted the PS-Poll frame.

After the STA receives the TIM, it may be determined whether the STA is to transmit a PS-Poll frame on the DL oriented channel according to the capabilities of the STA.

That is, the STA may negotiate with the AP about whether a PS-Poll frame is to be transmitted on a DL oriented channel or a normal channel, during association.

Without negotiating about a PS-Poll transmission scheme for the STA, the AP may determine whether the STA is to transmit a PS-Poll frame on a DL oriented channel or a normal channel, and indicate the determination result in the TIM. Therefore, the STA may determine whether to transmit a PS-Poll frame on a DL oriented channel or a normal channel based on the information received from the AP. The following drawing illustrates such an example.

Figure 21:
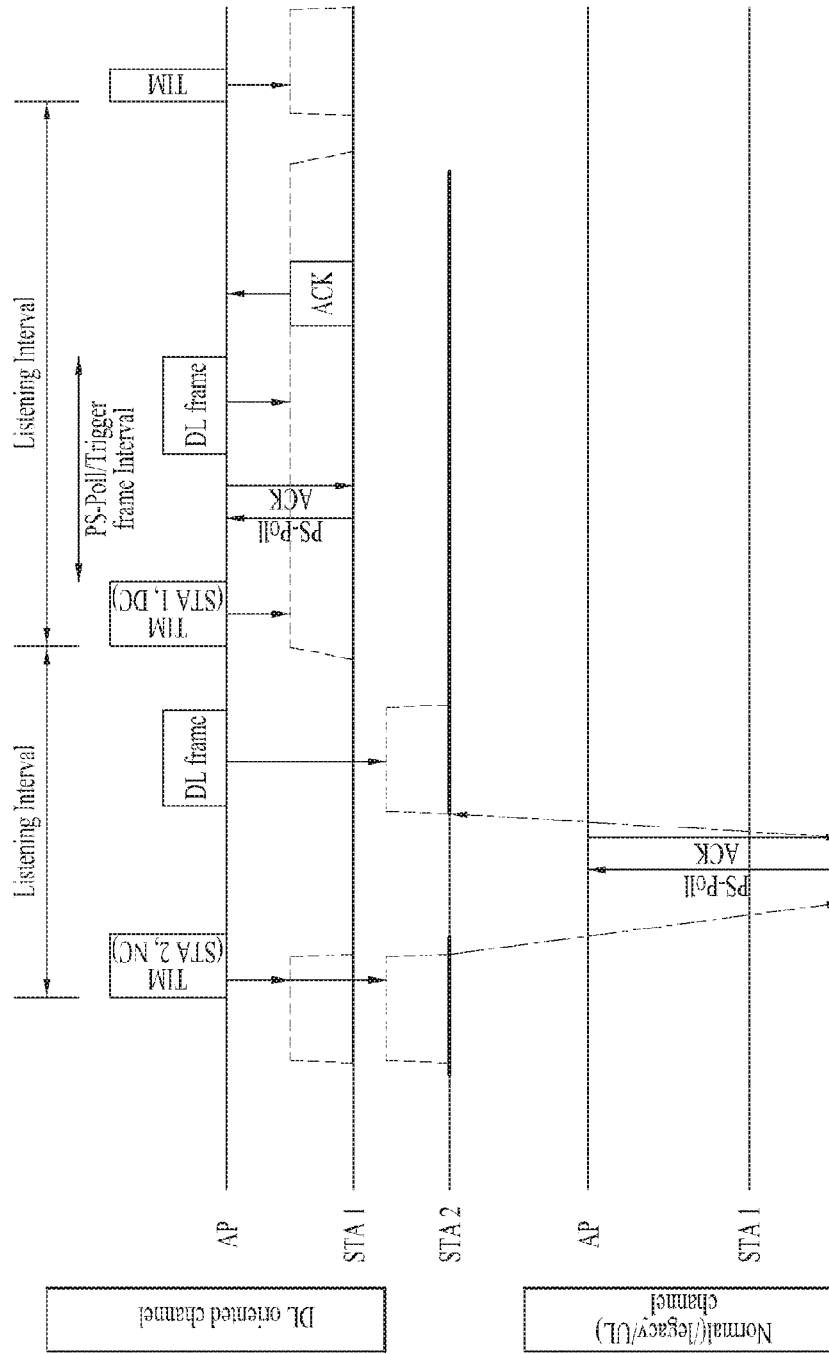
FIG. 21 is a diagram illustrating an example of changing a channel on which to transmit a PS-Poll signal by an STA operating in a PS mode according to an embodiment of the present invention.

FIG. 21 is a diagram illustrating an example of changing a channel on which to transmit a PS-Poll signal by an STA operating in a PS mode according to an embodiment of the present invention.

In FIG. 21, STA1 and STA2 are associated with the AP and stay on the DL oriented channel in the PS mode. The STAs may determine whether there is data destined for the STAs by receiving a TIM on the DL oriented channel from the AP.

A first TIM indicates STA2, and an indicator indicating transmission of a PS-Poll frame on a Normal Channel (NC) may be included in a frame carrying the TIM. Accordingly, STA2 may receive the TIM, switch to the normal channel, and transmit a PS-Poll frame on the normal channel. If STA2 successfully receives an ACK for the PS-Poll frame, STA2 may switch to the DL oriented channel and receive a DL frame from the AP on the DL oriented channel.

In the above example, a second TIM indicates STA1 and an indicator indicating transmission of a PS-Poll frame on a Downlink oriented Channel (DC) may be included in a frame carrying the second TIM. Accordingly, STA1 may receive the frame including the second TIM, transmit a PS-Poll frame on the DL oriented channel, and then receive a DL frame from the AP on the DL oriented channel.

Figure 22:
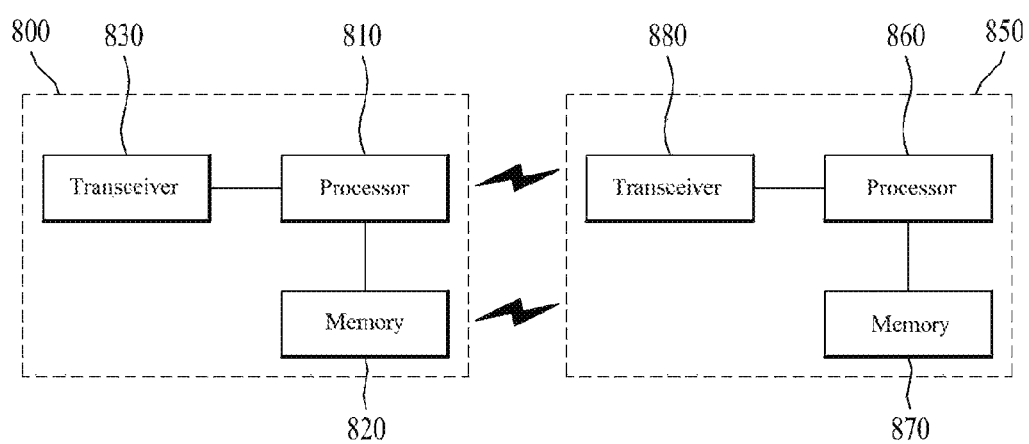
FIG. 22 is a block diagram illustrating apparatuses for implementing the above WLAN operation methods that use a DL oriented channel.

FIG. 22 is a diagram for explaining an apparatus for implementing the above-described method.

A wireless apparatus 800 of FIG. 22 may correspond to the above-described STA and a wireless apparatus 850 of FIG. 22 may correspond to the above-described AP.

The STA 800 may include a processor 810, a memory 820, and a transceiver 830 and the AP 850 may include a processor 860, a memory 870, and a transceiver 860. The transceivers 830 and 880 may transmit/receive a wireless signal and may be implemented in a physical layer of IEEE 802.11/3GPP. The processors 810 and 860 are implemented in a physical layer and/or a MAC layer and are connected to the transceivers 830 and 880. The processors 810 and 860 may perform the above-described UL MU scheduling procedure.

The processors 810 and 860 and/or the transceivers 830 and 880 may include an Application-Specific Integrated Circuit (ASIC), a chipset, a logical circuit, and/or a data processor. The memories 820 and 870 may include a Read-Only Memory (ROM), a Random Access Memory (RAM), a flash memory, a memory card, a storage medium, and/or a storage unit. If an embodiment is performed by software, the above-described method may be executed in the form of a module (e.g., a process or a function) performing the above-described function. The module may be stored in the memories 820 and 870 and executed by the processors 810 and 860. The memories 820 and 870 may be located at the interior or exterior of the processors 810 and 860 and may be connected to the processors 810 and 860 via known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

While the present invention has been described above in the context of an IEEE 802.11 WLAN system, the present invention is not limited to the specific system. Therefore, the present invention is applicable in the same manner to various wireless systems requiring control of interference between wireless devices.

What is claimed is:

1. A method of operating in a power save mode by a Station (STA) in a Wireless Local Area Network (WLAN) system, the method comprising:
    entering the power save mode after performing an association procedure with an Access Point (AP);
    receiving a Traffic Indication Map (TIM) from the AP in a listening interval configured for the power save mode;
    if the TIM indicates the presence of data to be received from the AP, transmitting a Power Save Poll (PS-Poll) signal to the AP;
    receiving a response signal to the PS-Poll signal from the AP; and
    receiving data from the AP,
    wherein the TIM reception, the transmission of the PS-Poll signal, and the data reception are performed on a downlink oriented channel or a normal channel distinguished from the downlink oriented channel, and the STA preliminarily acquires information indicating on which channel between the downlink oriented channel and the normal channel the TIM reception, the transmission of the PS-Poll signal, and the data reception are performed.

2. The method according to claim 1, wherein the downlink oriented channel is a channel configured for the AP to transmit data to STAs associated with the AP, and the associated STAs are not allowed to transmit data to the AP on the downlink oriented channel.

3. The method according to claim 1, wherein the STA receives the TIM on the normal channel, and monitors the normal channel in every listening interval during operation in the power save mode.

4. The method according to claim 3, wherein the PS-Poll signal is transmitted on the normal channel, and the response signal to the PS-Poll signal includes information indicating whether the data is to be received from the AP on the downlink oriented channel or the normal channel.

5. The method according to claim 3, further comprising negotiating with the AP about whether the data reception is performed on the downlink oriented channel or the normal channel,
    wherein the data is received from the AP on the negotiated channel.

6. The method according to claim 1, wherein the STA receives the TIM on the downlink oriented channel, and monitors the downlink oriented channel in every listening interval during operation in the power save mode.

7. The method according to claim 6, wherein if the TIM received on the downlink oriented channel indicates the presence of data to be transmitted to the STA, the STA switches to the normal channel and transmits the PS-Poll signal on the normal channel.

8. The method according to claim 7, wherein upon receipt of a response signal to the PS-Poll signal, the STA switches to the downlink oriented channel and receives data from the AP on the downlink oriented channel.

9. The method according to claim 6, wherein if the TIM received on the downlink oriented channel indicates the presence of data to be transmitted to the STA, the STA transmits the PS-Poll signal on the downlink oriented channel.

10. The method according to claim 9, wherein the AP transmits configuration information about a PS-Poll signal transmission interval to the STA, and the STA transmits the PS-Poll signal during the PS-Poll signal transmission interval.

11. The method according to claim 6, wherein if the TIM received on the downlink oriented channel indicates the presence of data to be transmitted to the STA, the STA transmits the PS poll signal on the downlink oriented channel or the normal channel according to negotiation during performing the association procedure with the AP.

12. A method of supporting a power save mode of a Station (STA) by an Access Point (AP) in a Wireless Local Area Network (WLAN) system, the method comprising;
    performing an association procedure with one or more STAs;
    receiving a signal indicating entrance into the power save mode from a first STA among the one or more STAs;
    if there is data to be transmitted to the first STA, transmitting a Traffic Indication Map (TIM) to the first STA in a listening interval configured for the power save mode;
    receiving a Power Save Poll (PS-Poll) signal from the first STA;
    transmitting a response signal to the PS-Poll signal to the first STA; and
    transmitting data to the first STA,
    wherein the TIM transmission, the reception of the PS-Poll signal, and the data transmission are performed on a downlink oriented channel or a normal channel distinguished from the downlink oriented channel, and the AP preliminarily acquires information indicating on which channel between the downlink oriented channel and the normal channel the TIM transmission, the reception of the PS-Poll signal, and the data transmission are performed.

13. A Station (STA) supporting a power save mode in a Wireless Local Area Network (WLAN) system, the STA comprising;
    a transceiver configured to transmit and receive a signal to and from an Access Point (AP) on a downlink oriented channel or a normal channel distinguished from the downlink oriented channel; and
    a processor connected to the transceiver and configured to control operation of the transceiver,
    wherein the processor is configured to enter the power save mode after performing an association procedure, and if the transceiver receives a Traffic Indication Map (TIM) from the AP in a listening interval configured for the power save mode and the TIM indicates the presence of data to be received from the AP, to transmit a Power Save Poll (PS-Poll) signal to the AP, receive a response signal to the PS-Poll signal from the AP, and receive data from the AP, through the transceiver, wherein the TIM reception, the transmission of the PS-Poll signal, and the data reception are performed on a downlink oriented channel or a normal channel distinguished from the downlink oriented channel, and wherein the processor preliminarily acquires information indicating on which channel between the downlink oriented channel and the normal channel the TIM reception, the transmission of the PS-Poll signal, and the data reception are performed.

14. An Access Point (AP) for supporting a power save mode of a Station (STA) in a Wireless Local Area Network (WLAN) system, the AP comprising;

a transceiver configured to transmit and receive a signal to and from one or more STAs on a downlink oriented channel or a normal channel distinguished from the downlink oriented channel; and a processor connected to the transceiver and configured to control operation of the transceiver, wherein the processor is configured to perform an association procedure with the one or more STAs, to receive a signal indicating entrance into the power save mode from a first STA among the one or more STAs through the transceiver and, if there is data to be transmitted to the first STA, to transmit a Traffic Indication Map (TIM) to the first STA in a listening interval configured for the power save mode, receive a Power Save Poll (PS-Poll) signal from the first STA, transmit a response signal to the PS-Poll signal to the first STA, and transmit data to the first STA, through the transceiver, wherein the TIM transmission, the reception of the PS-Poll signal, and the data transmission are performed on a downlink oriented channel or a normal channel distinguished from the downlink oriented channel, and wherein the processor preliminarily acquires information indicating on which channel between the downlink oriented channel and the normal channel the TIM transmission, the reception of the PS-Poll signal, and the data transmission are performed.

\* \* \* \* \*